Patented Dec. 7, 1926.

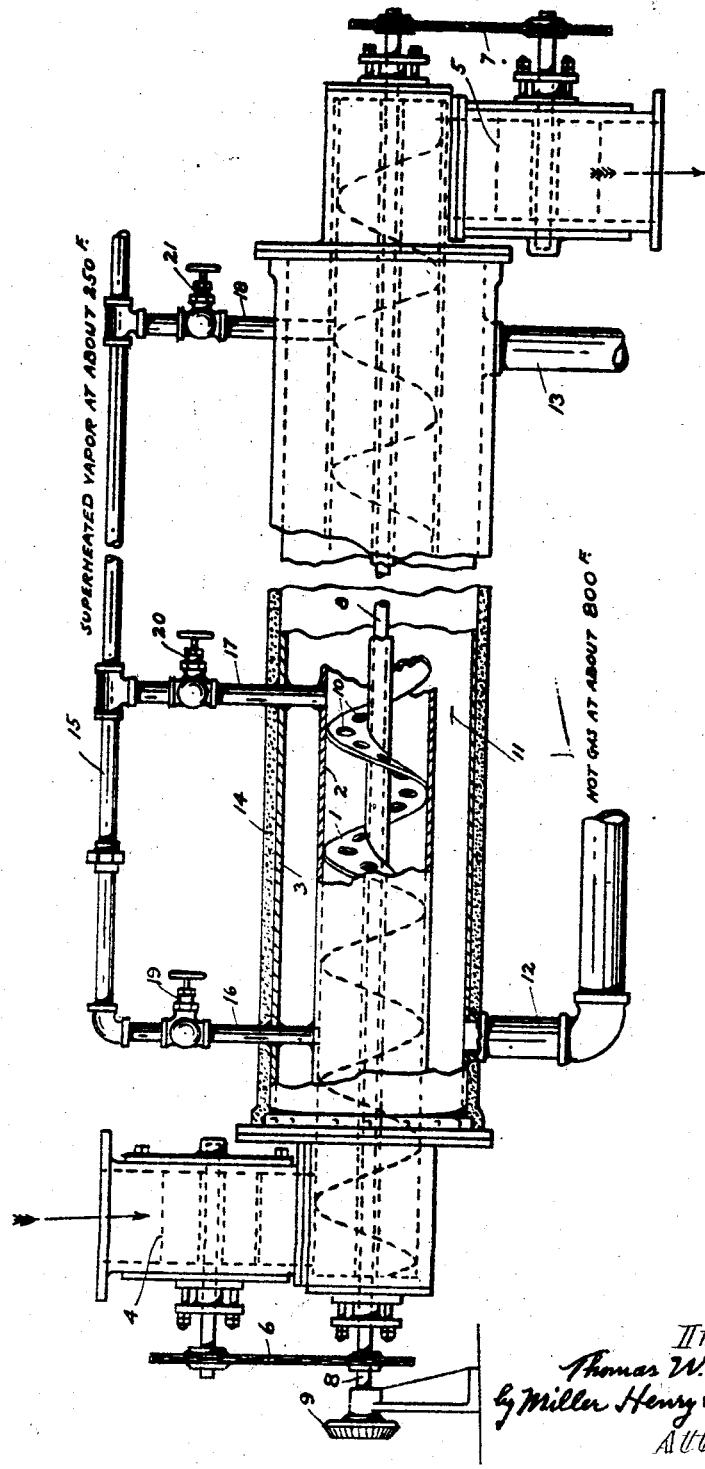

1,609,705

UNITED STATES PATENT OFFICE.

THOMAS W. W. FORREST, OF OAKLAND, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA.

HEAT-TREATING APPARATUS FOR FRUIT.

Application filed June 17, 1925. Serial No. 37,677.

This invention relates to apparatus for the heat treating of fruit, especially raisins in preparing them for seeding, and for carrying out part of my process of treating dried fruits as described in my copending application filed under Serial 37,676 on June 17th, 1925, and wherein the process requires the quick application of an intense heat to the exterior of the fruit while the fruit is also subject to the action of a superheated vapor of very low humidity and of lesser heat than the intense heat mentioned, for the purpose of swelling and softening the same.

The object of the invention is to provide apparatus in which the treatment of fruit as above outlined may be carried out.

In the drawings hereto the preferred form of construction of my apparatus is shown, the representation being a side elevation with portion of the casing of the apparatus broken away to reveal the interior.

The apparatus as shown comprises a spiral conveyor flight 1 revolvably mounted in a cylinder 2 spacedly surrounded by another cylinder 3.

The cylinders are sealed from one another by suitable walls so as not to communicate, and the inner or conveyor cylinder is provided at the receiving end with a gate 4 for feeding fruit to the conveyor without opening the conveyor cylinder to the air while at the discharge end a similar gate 5 provides for ejection of the treated fruit.

Such gates as mentioned being old in the art need not be described, suffice to say that those shown are of the revolving type connected by suitable gears or chain as indicated at 6 and 7 for driving from the conveyor shaft 8 which projects through both ends of the conveyor housing and is itself driven through any suitable means such as a pulley or gear 9.

The conveyor flight is perforated along its spiral blade with holes 10 large enough to permit some of the fruit being treated to fall through as the same is conveyed along, thus causing a constant tumbling or turning over of the fruit as it passes through the conveyor.

To the outer or space 11 between the cylinders extends a pipe 12 through which a hot gas (in the case of raisins heated to a heat of about 800 F.) enters at the receiving end of the combination to circulate around the inner cylinder and return (preferably to the gas heating plant not shown) through the pipe 13 near the discharge end of the device.

The outer cylinder is preferably covered with suitable heat insulating material 14 so as to conserve as far as possible the intense heat from the gas so that the metal of the inner cylinder will be raised substantially to 800 F. and the whole apparatus is preferably slightly inclined downwardly toward the discharge end as indicated so as to make the interiors self draining.

Extending through the outer cylinder and communicating only with the interior cylinder is a hot vapor pipe 15.

This pipe 15 preferably enters the inner cylinder at a plurality of points indicated at 16, 17 and 18, each branch being provided with a separate control valve 19, 20 and 21 so that the entrance of hot vapor at different points along the path of travel of the fruit may be varied as the condition of the emerging fruit may determine.

In the treatment of raisins in carrying out my process mentioned, a superheated steam, or more correctly vapor at a temperature from about 230 to 250 F. is admitted through the pipe 15 to the fruit being conveyed along. This vapor is made by means not shown by superheating steam reduced to little or no pressure above atmospheric pressure, until its temperature rises approximately to the point mentioned, consequently the vapor is of very low humidity, in fact a gas and quite invisible if exhausted to the air.

In operation on raisins, the fruit at room temperature enters through the receiving gate 4 and the conveyor is revolved to carry the raisins through in a very short space of time—usually about 12 seconds in a twelve foot conveyor being found correct, while the 800° heat is applied to the conveyor cylinder and the superheated vapor of lesser intensity to the fruit in transit.

Owing to the very rapid passage and constant turning over of the raisins against the hot cylinder or plate, scorching is prevented and the raisins are quickly penetrated by a heat more localized in the skin, and the raisins emerge at a general temperature of about 142 F.

This rapid intense action combined with the effect of the vapor at lesser heat has a puffing action on the raisins whereby they are considerably increased in bulk as well as enhanced in flavor and rendered of a pliable homogeneous consistency far superior to raisins treated with live steam or hot water.

Having thus described my invention it will be seen that modification may be made in the apparatus by which this combination of heat may be applied to the fruit and any such as come within the spirit of the invention are intended to be claimed hereunder.

I claim:—

1. Apparatus of the character described adapted for heat treating dried fruit including a cylinder arranged in substantially horizontal position, means for heating said cylinder, a screw conveyor mounted for revolution within the cylinder adapted for conveying dried fruit therethrough and the conveyor flight being perforated in a manner to permit some of the dried fruit falling through the perforations to cause a tumbling action of the fruit as it passes along the conveyor.

2. Apparatus as specified in claim 1 provided with a plurality of steam pipes spaced along the conveyor cylinder each provided with a separate control for varying the steam at different points therealong.

3. An apparatus as specified in claim 1 plus an outer cylinder spaced from the first mentioned cylinder and provided with heat retaining walls, means for introducing steam to the inner cylinder and means for heating the space between the cylinders to about 800 degrees F.

THOMAS W. W. FORREST.